July 20, 1965  B. SMITH  3,196,385
TRANSFERRING SEISMIC TRACES AT SYNCHRONIZED FIRING TIMES
Filed July 11, 1960  3 Sheets-Sheet 1
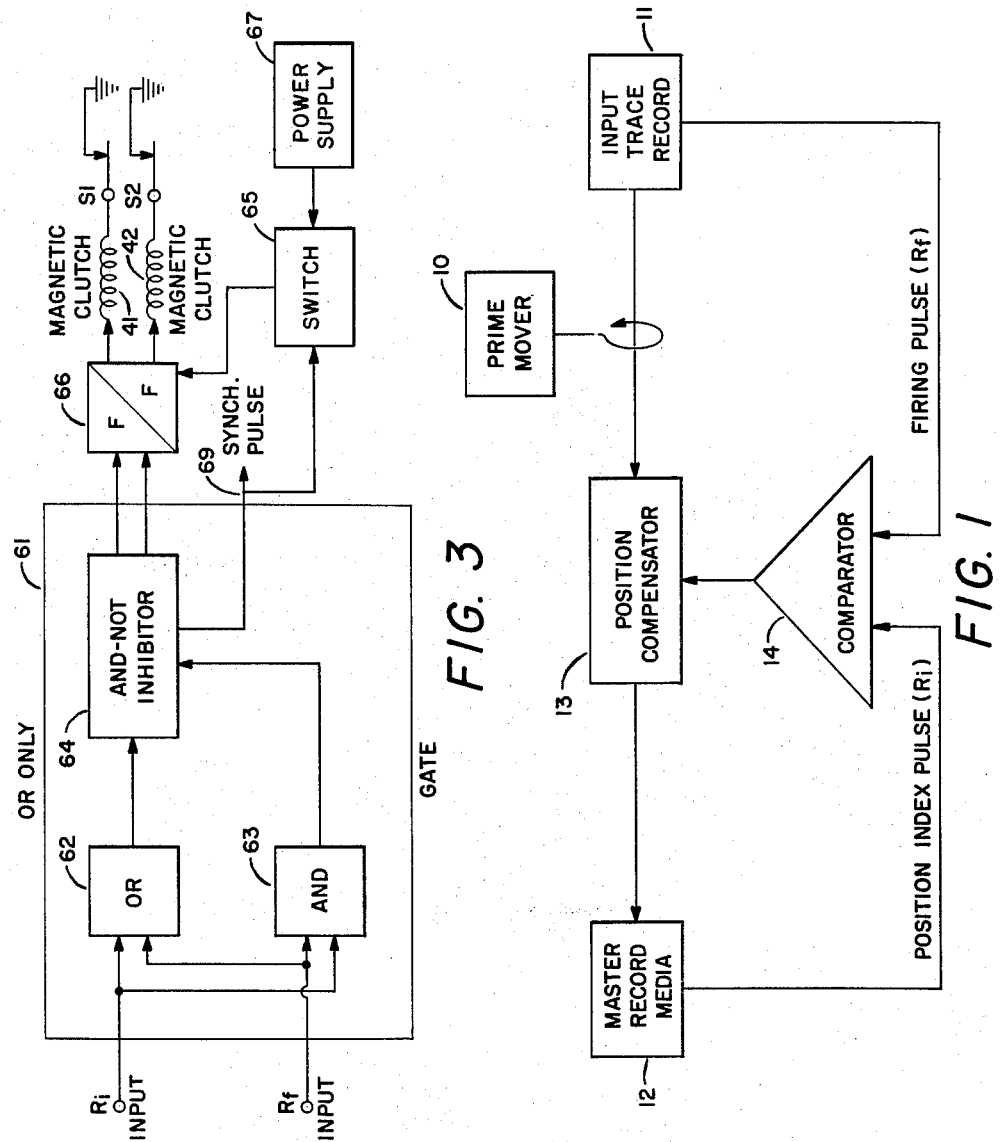
INVENTOR.
BILL SMITH
BY
Carl A. Cline
AGENT

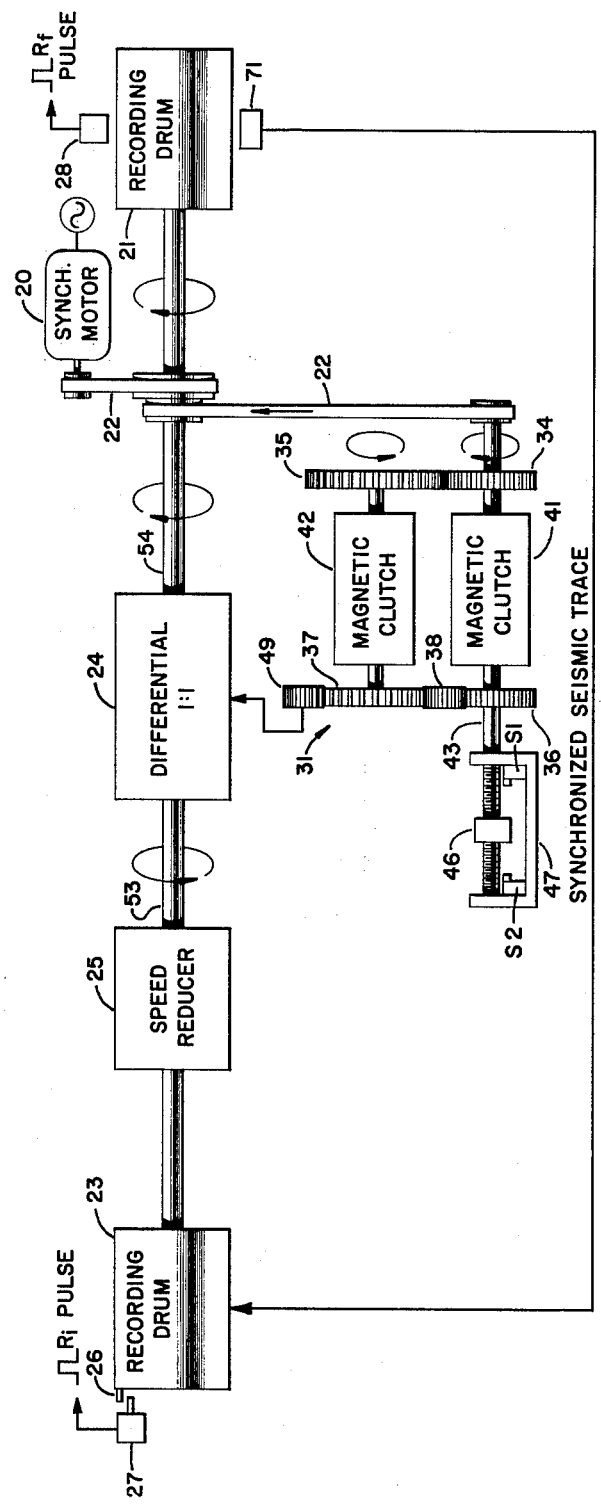

July 20, 1965  B. SMITH  3,196,385
TRANSFERRING SEISMIC TRACES AT SYNCHRONIZED FIRING TIMES
Filed July 11, 1960  3 Sheets-Sheet 3

INVENTOR
BILL SMITH
BY
Carl A. Cline
AGENT

United States Patent Office 3,196,385
Patented July 20, 1965

3,196,385
TRANSFERRING SEISMIC TRACES AT
SYNCHRONIZED FIRING TIMES
Bill Smith, Ponca City, Okla., assignor to Continental Oil
Company, Ponca City, Okla., a corporation of
Delaware
Filed July 11, 1960, Ser. No. 42,143
14 Claims. (Cl. 340—15.5)

This invention relates to a system for correlating a plurality of seismic waves, and more particularly, but not by way of limitation, to a system for automatically synchronizing a plurality of seismic waves with respect to the firing time of the shot or impulse which gave rise to the waves.

Seismic prospecting has long been employed to provide indications of subsurface lithology. In the usual situation an impulse or shot is "fired" and the shock waves as influenced by subsurface strata are detected at a number of points remote from the shot source. The seismic traces so obtained are thereafter analyzed to ascertain parameters of the formations through which the shock waves move.

One useful analysis requires the individual traces to be correlated along a time axis with respect to the time of firing the "shot." This correlation or synchronizing of the seismic traces to provide seismic time sections can be obtained by manual manipulation if care is used in determining the position of the firing instant on each trace and in aligning the firing reference points along a common time axis. While such manual synchronizing may be possible, it has the disadvantages of being time consuming and uneconomical.

The principal object of the present invention is to provide a seismic wave synchronization system which is simple in concept, automatic in operation and economical to construct and maintain.

This broad object is attained by employing a novel positional servo system which automatically compares reference pulses recorded on each individual record, which are related to the firing time of the shot, and an index pulse generated by a master recording medium. The comparison operates to generate an error signal which controls the relative movement of one or more individual traces and the master recording medium to synchronize the reference and index pulses. Any changes in the synchronization causes an error signal proportional to the error to be generated which, in turn, acts to reduce the time displacement between the two pulses to zero. When synchronization is again established, no error signal is generated and a common prime mover maintains velocity synchronization of the master recording medium and an individual record as the latter is transferred to the master medium.

The synchronizing seismic system herein proposed allows a plurality of individual seismic waves to be correlated automatically with respect to a common occurrence. A feature of the invention pertains to the employment of indexing and reference pulses to identify, respectively, instant angular or rotational positions of a master recording drum and a readout drum or tape recorder, the latter of which is used to re-record an individual trace.

Another feature of the invention relates to comparator means which measure the time delay between the detection of a reference pulse superimposed on an individual trace, and the indexing pulse generated at an instant position of the master recording medium. The time delay or error signal is used to control a compensator circuit. The latter, in turn, acts to successively reduce the angular lag of the reference pulse with respect to the index pulse until the time delay is zero.

Yet another feature pertains to means responsive to the zero error signal representing a synchronous condition to block further relative movement between the master recording medium index and the instant of a shot-pulse on an individual wave trace.

These and other objects and features of the present invention may be more fully understood when the following detailed description is read with reference to the drawings in which:

FIGURE 1 is a functional block diagram of a synchronizing system in accordance with the present invention;

FIGURE 2 is a schematic diagram of the apparatus forming the synchronous seismic system;

FIGURE 3 is an electro-mechanical schematic diagram of the comparator and position compensator means utilized in the exemplary embodiment of the present invention; and, FIGURES 4 and 4A illustrate the generation of pulses, the operation of position compensator clutches and the phase difference between pulses correlated along a time axis.

Figure 4A:
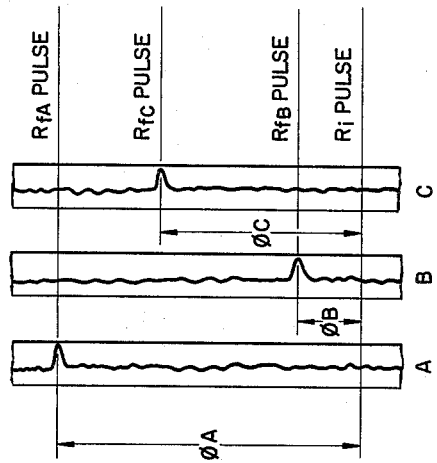

The broad features of the present invention may be appreciated by consideration of the block diagram of FIG. 1. A prime mover 10 synchronously drives the input trace record 11 and master record media 12, the latter through the position or phase compensator 13. A pulse comparator 14 receives input pulses from the master record media 12 ($R_i$) and input trace record 11 ($R_f$) and generates an error signal which is proportional to the angular displacement between the points of generation of the input pulses. The error signal controls the position compensator 13 to reduce the phase displacement between the $R_i$ and $R_f$ pulses to zero. When the pulses lock in synchronously, the error signal output of comparator 14 is zero and the prime mover 10 maintains the positional synchronism of the two record medias. The presence of a zero error signal can also be used to initiate recording of the individual trace, heretofore on individual trace record 11, on to one channel of master record media 12.

The index pulse $R_i$ may be generated by any means to represent an instant angular position of the master record media 12 and the reference pulses $R_f$, as noted above, are superimposed on the individual traces in preselected relation to the seismic "firing" time. The reference pulse is detected by means associated with the input trace record 11 and applied to the input of comparator 14.

FIGS. 2 and 3 depict the exemplary embodiment of the invention as more broadly illustrated in FIG. 1. Looking more particularly to FIG. 2, it can be seen that synchronous motor 20 drives readout drum 21 through a belt drive 22 and master record drum 23 through a 1:1 differential 24 and speed reducer 25.

The record drum or common recorder 23 exemplarily has a projecting arm 26 formed on one end which enables pulse source 27 each time the arm 26 makes a complete revolution. Pulse source 27, therefore, generates an indexing pulse $R_i$ each time the recorder arm 26 rotates 360°. Pulse source 27 may include a conventional pulse source and use electronic or electro-mechanical enabling means. The pulse source per se forms no part of the present invention.

Cooperating with readout drum or input recorder 21, which may be a conventional tape recorder, is a firing pulse readout head 28 which detects the firing pulses $R_f$ that are placed on the seismic trace to indicate the impulse or shot time or multiples thereof. Pulse readout head 28 may be a conventional magnetic or light sensitive means depending upon the way in which the individual trace was originally recorded.

A part of the belt drive 22 is connected to the position compensator apparatus 31, equivalent in function to position compensator 13. The belt drive 22 and the $R_f$ and $R_i$ pulses cooperate to control apparatus 31 which is operable to change the phasing of the shaft on each end of differential 24. The apparatus 31 includes two pairs of cooperating pinion gears 34–35 and 36–37. Pinions 34 and 36 are supported on coincident shafts that may be operatively coupled together by energizing a magnetic clutch 41 such as the type made by Reeves Instrument Corporation of New York, N.Y. Similarly, gears 35 and 37 are supported on coincident shafts that may be coupled together by energizing a second magnetic clutch 42. A shaft 43, connected to gear 36, is threaded on one end to cooperate with an activating nut 46 and limit switches S1 and S2 mounted on a suitable frame 47. As shaft 43 is rotated clockwise, nut 46, which is threaded thereon but pinned against rotation, moves axially toward switch S1. When nut 46 engages switch S1 it breaks its contacts. Similarly, counterclockwise rotation of shaft 43, which will be obtained when magnetic clutch 42 is closed to drive the shaft through pinions 37, 38 and 36, causes nut 46 to strike switch S2 and open its contacts. The rotation of gear 37 also controls the differential 24 through rotation of pinion 49.

It can be seen that gears 34 and 35 are both rotated by rotation of belt drive 22, whereas gear 37 is only rotated when clutch 42 is energized. Gear 36 may be rotated either through energization of clutch 41 or by way of gears 37 and 38 when clutch 42 is energized. Idler gear 38 is suitably constructed and supported to rotate only when gear 37 drives it. In other words, rotation of pinion 36 via energization of clutch 41 will not drive 37. As a result of this arrangement, differential gear 49 only rotates to reduce the phase lag of the indexing pulse $R_i$ with respect to the next $R_f$ pulse.

The comparison and position compensation functions are simplified by utilizing a phase error signal of only one polarity, i.e., $R_i$ lagging $R_f$. Further, there is no reason not to do this since synchronism is important, and not the polarity of error signal decrease (by rotation clockwise or counterclockwise).

FIG. 3 illustrates schematically the circuit which cooperates with the apparatus of FIG. 2. The $R_i$ and $R_f$ pulses are inputs to an OR ONLY gate 61. Gate 61 includes an OR gate 62, an AND gate 63 and an AND-NOT inhibitor 64. When measuring reference pulse $R_f$ occurs, it operates the OR gate 62 and provides an input to the two-state multivibrator or flip-flop circuit 66. This flip-flop, which may be an Eccles-Jordan or other conventional multivibrator having two stable states, is caused to assume one of the states by the input pulse $R_f$. This completes a circuit for the winding of magnetic clutch 41 through normally closed contact S1. With belt drive 22 rotating gears 34 and 35, nut 46 is driven toward S1 until it strikes it to de-energize the circuit including the winding of clutch 41. Here the system remains until the first index pulse $R_i$ appears at the input of OR ONLY gate 61. Pulse $R_i$ passes OR gate 62 and gate 64 to cause the flip-flop 66 to switch states. The new state completes a circuit including the winding of magnetic clutch 42 and normally closed contact S2. The nut 46 then moves toward S2 since shaft 43 is rotated by way of gear 37 rather than 36. The nut 46 continues to rotate until either the next appearance of an $R_f$ pulse switches the flip-flop to interrupt the circuit or switch S2 is opened.

During the energization of clutch 42, gear 37 rotates gear 49 which rotates shaft 53 with respect to shaft 54 to reduce their phase difference. Thus, the signal energizing the clutch 42 corresponds to the "error signal" referred to in connection with FIG. 1. If synchronism is not obtained (i.e., error signal reduced to zero) before switch S2 is opened, the next appearance of an $R_f$ pulse causes nut 46 to move away from S2 (toward S1) thereby to reposition it for further reduction of the error signal upon the next appearance of index pulse $R_i$. In the usual case, synchronism is obtained within two revolutions of the drum 21, as will be shown below in connection with FIG. 4.

When the error signal is reduced to zero, the $R_f$ and $R_i$ pulses enable the AND gate 63 which inhibits gate 64. The inhibiting of gate 64 prevents subsequent operation of the two-state circuit 66, as by actuating switch 65 to interrupt the power applied from power supply 67 to the flip-flop 66, with the result that the synchronism is maintained. In other words, during the subsequent rotation or turn of the drum 21, the drum 23 will be turned at a precisely related rate for the proper transfer of a trace from the drum 21 to the drum 23. When the pulses $R_f$ and $R_i$ correspond, transfer of the trace from the drum 21 to the drum 23 is started in order to line up the firing times of all traces transferred to drum 23, as will be described.

Looking back to the apparatus of FIG. 2, it is apparent that the clutches 41 and 42 act individually to drive nut 46 toward switches S1 and S2, respectively, and the rotation of shaft 43 by way of gear 37 also operates differential 24 to reduce the error signal. For example, if a trace A (FIG. 4A) is put on the readout recorder 21, the system will operate to reduce $\phi A$ to zero. When $\phi A$ is reduced to zero, as evidenced by the inhibiting of circuit 66 (FIG. 3), the motor 20 will maintain the drums 21 and 23 in synchronous relation. A synchronous pulse 69 may be generated by INHIB gate 64 when it blocks operation of circuit 66 to enable a readout head 71 associated with readout drum 21 in order to transfer the synchronized trace A to the master record drum 23. In a similar fashion, other individual traces B and C may be synchronized with the $R_i$ pulse of drum 23 to reduce $\phi B$ and $\phi C$ (FIG. 4A) to zero before recording them on the master media 23.

Figure 4:
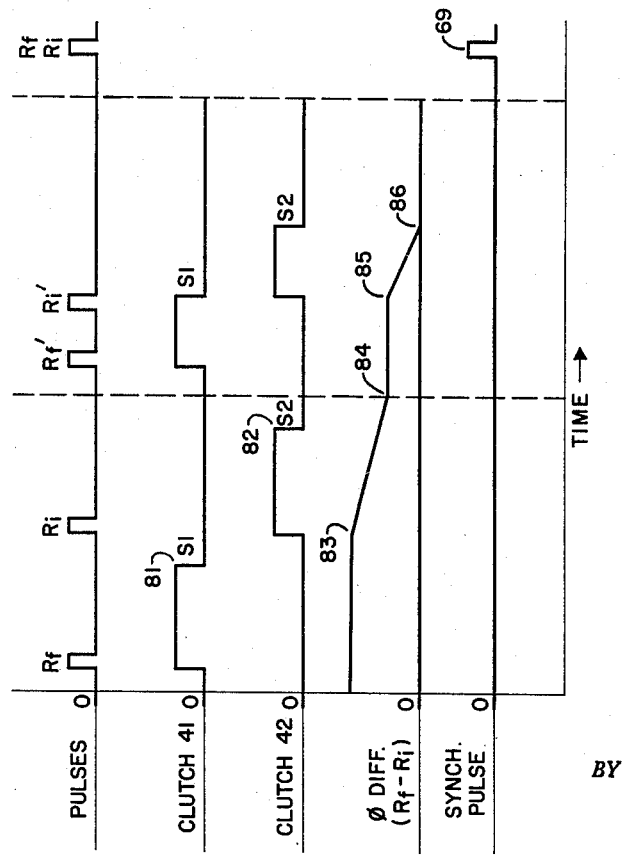

FIG. 4 illustrates the manner in which the phase differences of shafts 53–54 are reduced. As incoming pulse $R_f$ appears, it energizes clutch 41 until switch S1 is opened at 81. Thereafter, pulse $R_i$ appears and energizes clutch 42 until switch S2 opens the circuit at 82. During the energization of clutch 42, the $\Delta\phi\ R_f$–$R_i$ is reduced from 83 to 84. It remains at magnitude 84 through the operation of clutch 41 by pulse $R_f$ (which resets nut 46 away from switch S2.) When $R_i$ appears to energize clutch 42 and de-energize clutch 41, it decreases $\Delta\phi$ starting at 85 to zero (at 86). The circuit is broken by switch S2 and the drums rotate until pulses $R_i''$ and $R_f''$ next appear at the same time to enable the AND-NOT gate 64 and produce synch pulse 69. The former blocks further operation of the multivibrator 66 and the latter may start the recording of an individual trace (A, B or C) on the master record drum 23.

While the present invention has been described with reference to a particular embodiment, it should be apparent to those skilled in the art that other apparatus and arrangements might be employed to provide a seismic trace synchronizing system within the scope of the invention, which is to be limited only to the extent of the appended claims.

What is claimed is:

1. A system for correlating a plurality of individually obtained seismic waves with respect to a zero time representing the instant of firing the shots generating the waves comprising, in combination, means for generating at least one zero time signal, a plurality of seismic wave traces, each one of said seismic traces including a reference signal corresponding to the time of the seismic shot, means to detect the reference signal on a trace, and compensator means responsive to the time interval between the zero time and reference signals to delay the generation of the next zero time signal until the detection of the next reference signal thereby synchronizing said signals on a time base.

2. A system for correlating a plurality of individually obtained seismic waves with respect to a zero time representing the instant of firing the shots generating the waves in accordance with claim 1 and including recording means operable to record a plurality of seismic traces on adjoining channels and means responsive to the synchronizing of individual trace reference signals and the zero time signal to record the traces on individual ones of said channels.

3. A system in accordance with claim 1 wherein said compensator means includes a bi-stable multivibrator responsive to said signals to assume one state when the zero time signal is generated and to assume the other state when the reference signal is detected, and means operative when said multivibrator is in at least one of said states to synchronize the signals by controlling the zero time signal generating means.

4. A system in accordance with claim 3 and including means responsive to the synchronization of the signals to interrupt the control of the generating means.

5. A system for recording a plurality of individual recorded seismic waves on a common time base comprising, in combination, a recording drum, a readout drum, a seismic trace having at least one firing pulse superimposed thereon representing the firing time of a seismic shot, said trace being positioned on said readout drum, means to synchronously rotate said drums, means cooperating with said recording drum to generate an indexing pulse at a pre-selected rotational position thereof, and synchronizing means responsive to the indexing and reference pulses to eliminate time differentials between the occurrence of said pulses thereby to positionally synchronize said drums so that the seismic record can be transferred to said recording drum with the index pulse generating position corresponding to the firing time of the seismic shot.

6. A system for recording a plurality of individual recorded seismic waves on a common time base comprising, in combination, a recording drum, a readout drum, a seismic trace having at least one firing pulse superimposed thereon and positioned on said readout drum, power means to synchronously rotate said drums, a differential cooperating with said drums and operable to change the phasing between said drums, means cooperating with said recording drum to generate an indexing pulse at a pre-selected rotational position thereof, means to detect said indexing and firing pulses, and synchronizing means responsive to the time interval between the occurrence of the indexing and firing pulses to operate said differential thereby positionally synchronizing the drums by reducing the time lag between the pulses to zero, said synchronizing means including a bi-stable multivibrator, means including an OR gate to shift said multivibrator to one state when an indexing pulse is detected and to the other state when a firing pulse is detected, and differential driving means responsive to at least one of the states of said multivibrator to cause said differential to eliminate the time lag between the detection of said pulses.

7. A system for recording a plurality of individual recorded seismic waves on a common time base in accordance with claim 6 and including an AND gate responsive to the simultaneous detection of an indexing and firing pulse to generate a synchronous output pulse, and an AND-NOT inhibitor gate responsive to said synchronous pulse to disable said differential driving means.

8. A system for recording a plurality of individual recorded seismic waves on a common time base in accordance with claim 6 wherein said differential driving means includes a first circuit operative when said multivibrator is in said one state to retard the rotation of said recording drum up to a preselected amount thereby to reduce the time lag between the indexing and firing pulses, and a second circuit operative when said multivibrator is in said other state to reset the time lag controlling first circuit.

9. A system for recording a plurality of individual recorded seismic waves on a common time base in accordance with claim 8 wherein said differential driving means also includes a limit switch assembly having normally closed first and second switches connected in said first and second circuits, respectively, and an interrupter which cooperates with said limit switch assembly by moving toward said first switch when said first circuit is completed and toward said second switch when said second circuit is completed to break the respective circuits, the distance between said limit switches being selected to provide a preselected amount of time lag reduction upon the detection of successive indexing and firing pulses by said detecting means.

10. A system for recording a plurality of individual recorded seismic traces on a common time base comprising, in combination, a common recorder, means cooperating with said common recorder to repetitively generate an index pulse at a preselected rotational position thereof, an input recorder having at least one seismic record thereon, which record has at least one firing pulse recorded thereon, means for rotating said recorders at synchronous speeds, a compensator operable to rotate one of said recorders and the recording medium thereon relative to the other, and comparator means responsive to the firing and index pulses to cause said compensator to successively reduce the angular displacement between the appearance of said pulses until said recorders are positionally synchronized so that the seismic record can be transferred to said common recorder with the index pulse generation position constituting the firing instant of the seismic record.

11. A system for recording a plurality of individually recorded seismic traces on a common time base comprising, in combination, a common recorder having a recording medium thereon, means cooperating with said common recorder to repetitively generate an index pulse at a preselected rotational position thereof, an input recorder, a seismic wave trace record positioned on said input recorder and having a pulse representing the firing time recorded thereon, a phase compensator, means including a synchronous motor to rotate said recorders, said common recorder being rotated through said phase compensator, and comparator means responsive to the index and firing pulses to control said phase compensator to positionally synchronize the recorders, said comparator means including a multivibrator having two stable states, said multivibrator assuming one state responsive to the index pulse and the other state responsive to the firing pulse, means controlled by the multivibrator when in said one state to cause said phase compensator to retard rotation of said common recorder and means responsive to the simultaneous occurrence of said pulses to block operation of said phase compensator.

12. A system for recording a plurality of individual signals in mutual correlation which comprises; recording means having a recording medium associated therewith; means for generating an index pulse upon said recording means attaining a preselected position; means for generating a plurality of signals to be recorded, each of said signals having a reference pulse associated therewith; motive means connected to said recording means and to said signal generating means for actuating said means simultaneously; a differential disposed between said recording means and said motive means for changing the relative position of said recording means and said signal generating means; synchronizing means responsive to the time interval between an index pulse and reference pulse disposed between said differential and said motive means for operating said differential to change said time interval by changing temporarily the speed of said recording means.

13. The structure defined in claim 12 wherein said synchronizing means comprises a threaded shaft, a lead nut threaded upon said shaft, power means for driving said shaft to move said lead nut from a first position to a second position upon the occurrence of a reference pulse, actuating means for driving said shaft to move said lead nut from the second position to the first position upon the occurrence of said index pulse, and means connected to said actuating means for operating said differential during the time in which said nut moves from said second position to said first position.

14. The structure defined in claim 13 wherein said power means comprises a clutch responsive to said reference pulse and said index pulse and wherein said actuating means comprises a clutch responsive to said index pulse and to the arrival of said lead nut at said first position.

References Cited by the Examiner

UNITED STATES PATENTS

| | | | |
|---|---|---|---|
| 2,838,743 | 6/58 | Fredriksson | 340—15 |
| 2,860,323 | 11/58 | Burkhart | 340—174.1 |
| 2,976,107 | 3/61 | Klein | 340—15 X |

SAMUEL FEINBERG, *Primary Examiner.*

IRVING L. SRAGOW, CHESTER L. JUSTUS, *Examiners.*